(12) United States Patent
Collet

(10) Patent No.: US 11,040,866 B2
(45) Date of Patent: Jun. 22, 2021

(54) METHOD FOR DETECTING DEFECTIVE GAS FLOW IN A PURGE DEVICE VENT LINE

(71) Applicants: Continental Automotive France, Toulouse (FR); Continental Automotive GmbH, Hannover (DE)

(72) Inventor: Thierry Collet, Fontenilles (FR)

(73) Assignees: Continental Automotive France; Continental Automotive GmbH

(*) Notice: Subject to any disclaimer, the term of this patent is extended or adjusted under 35 U.S.C. 154(b) by 0 days.

(21) Appl. No.: 16/761,010

(22) PCT Filed: Nov. 13, 2018

(86) PCT No.: PCT/FR2018/052817
§ 371 (c)(1),
(2) Date: May 1, 2020

(87) PCT Pub. No.: WO2019/102103
PCT Pub. Date: May 31, 2019

(65) Prior Publication Data
US 2020/0377360 A1 Dec. 3, 2020

(30) Foreign Application Priority Data
Nov. 27, 2017 (FR) ...................................... 1761211

(51) Int. Cl.
*B67D 7/32* (2010.01)
*G01F 23/00* (2006.01)
(52) U.S. Cl.
CPC ....... *B67D 7/3227* (2013.01); *G01F 23/0069* (2013.01)

(58) Field of Classification Search
CPC .......................... B67D 7/3227; G01F 23/0069
See application file for complete search history.

(56) References Cited

U.S. PATENT DOCUMENTS

| 2004/0089275 | A1* | 5/2004 | Kidokoro ........... F02M 25/0836 123/520 |
| 2017/0030303 | A1 | 2/2017 | Takakura |
| 2017/0045019 | A1 | 2/2017 | Dudar et al. |

OTHER PUBLICATIONS

English Translation of the Written Opinion for International Application No. PCT/FR2018/052817, dated Feb. 26, 2019, 5 pages.

(Continued)

*Primary Examiner* — Jason K Niesz
(74) *Attorney, Agent, or Firm* — RatnerPrestia

(57) ABSTRACT

A method for detecting defective gas flow in a vent line of a device for purging a fuel vapor absorption filter of a vehicle's internal combustion engine during filling the vehicle's tank with fuel from a filler nozzle having a venturi effect duct, so as to stop the filling when the duct is full of fuel. The vent line connecting the fuel tank to the filter. The tank having: a filler pipe, at the end of which is a stopper designed so that, during filling with fuel from the filling nozzle, fuel vapors are evacuated through the vent line. At least one gauge measures fuel volume in the tank. The detection method continuously measuring the volume of fuel in the tank during filling and comparing a volume profile thus measured with respect to time against a predetermined volume profile. A defective flow detected if the two profiles do not match.

7 Claims, 4 Drawing Sheets

(56) References Cited

OTHER PUBLICATIONS

International Search Report and Written Opinion for International Application No. PCT/FR2018/052817, with partial English translation, dated Feb. 26, 2019, 8 pages.
International Search Report and Written Opinion for International Application PCT/FR2018/052817, dated Feb. 26, 2019, 9 pages (French).

* cited by examiner

METHOD FOR DETECTING DEFECTIVE GAS FLOW IN A PURGE DEVICE VENT LINE

CROSS REFERENCE TO RELATED APPLICATIONS

This application is the U.S. National Phase Application of PCT International Application No. PCT/EP2018/052817, filed Nov. 13, 2018, which claims priority to French Patent Application No. 1761211, filed Nov. 27, 2017, the contents of such applications being incorporated by reference herein.

FIELD OF THE INVENTION

The invention concerns a method for detecting defective gas flows in a purge line of a purge device of a fuel vapor absorption filter of an internal combustion engine of a vehicle.

BACKGROUND OF THE INVENTION

Fuel tanks of modern vehicles driven by a petrol-powered internal combustion engine are equipped with a system for recycling the fuel vapors originating from the fuel tank, which is designed to recover the fuel vapors and reinject these fuel vapors into the intake manifold of the internal combustion engine.

These recycling systems mainly comprise:
- an active charcoal filter which absorbs fuel vapors originating from the fuel tank,
- a vent line connecting the tank to the filter,
- a breather line opening the absorption filter to the fresh air and comprising a breather valve,
- a purge line comprising a purge valve and connected on one side to the absorption filter and on the other side, via at least one purge pipe, to the intake manifold of the internal combustion engine,
- a control module generally comprising an electronic engine control unit (ECU).

Also, when these recycling systems are mounted on a vehicle equipped with a naturally aspirated engine, the purge line comprises a single purge line extending between the purge valve and the intake manifold downstream of the butterfly valve of the latter.

However, when these recycling systems are mounted on a vehicle equipped with a turbocharged engine, the purge line comprises two purge pipes: a purge pipe called the high-pressure pipe which is designed to conduct fuel vapors when the turbocharger is in operation, and a purge pipe called the low-pressure pipe which is designed to conduct the fuel vapors when the engine is running in naturally aspirated mode.

Such recycling systems primarily allow, in particular when the vehicle is stationary, recovery and storage of fuel vapors from the tank in the active charcoal absorption filter.

These recycling systems are also intended to cause the extraction and recycling of fuel vapors trapped in the absorption filter. To this end, the electronics of the engine control unit command the opening of the purge valve so as to apply the vacuum prevailing in the intake manifold to the absorption filter. Furthermore, a circulation of air is generated through the absorption filter, resulting from the normally open position of the breather valve after start-up of the engine, and control of the purge valve causes extraction of the trapped hydrocarbons which are conducted to the intake manifold before being burned during the combustion phase of the internal combustion engine. This purge is performed using the command to open the purge valve, which is repeated at a fixed frequency of for example 10 Hz.

These recycling systems are also subject to standards of on-board diagnostics (OBD) which in particular require:
- monitoring of the tightness (absence of leaks) in all engine states, whether stationary or running, and at least once per driving cycle,
- monitoring of an effective flow of fluid in the vent line and in the purge line, so as to allow venting of the tank and purging of the absorption filter, which allows desorption of the absorption filter and injection of the fuel vapors extracted during this desorption into the intake manifold of the internal combustion engine, or in other words detection of a defective flow resulting from disconnection of the vent line or purge line, total or partial crushing thereof, or total or partial obstruction thereof.

In order to guarantee the quality of monitoring, the conditions thereof must also fulfil requirements established by standards, in particular the applicable American antipollution standards (LEV II, LEV III).

Certain vehicles sold in certain countries, such as United States, China, Korea etc., must observe these standards which are very strict and limit the escape of petrol vapors into the environment close to the vehicle. To this end, they are equipped with ORVR or "on-board refueling vapor recovery" systems, i.e. the on-board system for recovering vapors during filling of the tank with fuel. Said systems currently comprise a tank stopper which is effectively sealed, i.e. said stopper is completely sealed when closed and has a very small leakage flow during filling of the tank with fuel through a nozzle, in order to limit as far as possible the escape of hydrocarbons into the atmosphere during the filling phase. This ORVR system is known to those skilled in the art and will not be described in more detail here.

The vapors generated during filling are then conducted to the recycling system in order to be evacuated via the vent line and captured by the absorption filter.

However, for example in European territories, the fuel filling nozzle is equipped with a fuel vapor absorption system.

For monitoring intended to detect any defective fluid flows in a purge line of a purge device (purge pipe connecting the tank to the purge valve), the only current method of detecting any defective fluid flows in a purge pipe consists of fitting a pressure sensor to the purge line, either upstream in the vent line or downstream of the purge valve in the purge line, allowing measurement of abnormally high pressure, or a flow sensor either upstream or downstream, allowing measurement of abnormal flows and hence a potential problem with gas flow.

However, this detection method requires the recycling systems to be fitted with a pressure sensor specifically dedicated to diagnosing the detection of defective flow in the purge lines, and various accessories necessary for connecting this pressure sensor and processing its measurement signals.

Furthermore, such a pressure or flow sensor is dedicated to one line. In the present circuit, the problem of gas flow and crushing of the pipe may occur upstream or downstream of the purge valve, either in the vent line or in the purge line. For reliable detection therefore, each of the purge lines must be fitted with a sensor, which means adding two sensors per vehicle, which constitutes an undesirable additional cost.

SUMMARY OF THE INVENTION

An aspect of the present invention aims to remedy this drawback and provide a reliable, robust method which fulfils the requirements, allowing detection of defective fluid flow in a vent line (that connecting the tank to the purge valve) of a purge device fitted to a vehicle equipped with an ORVR system having the characteristics listed above, in this case equipped with effectively sealed tank stoppers, without requiring any additional device or element intended for this detection.

An aspect of the invention proposes a method for detecting a defective gas flow in a vent line of a device for purging a fuel vapor absorption filter of an internal combustion engine of a vehicle during a filling of a tank provided in the vehicle with fuel from a filler nozzle comprising a venturi effect duct, so as to stop the filling when the duct is full of fuel, said vent line connecting the fuel tank to said filter, the tank being equipped with:
　　a filler pipe, at the end of which is a stopper, and
　　a degassing pipe connecting the top of the tank to the filler pipe, wherein the stopper, the degassing pipe and the vent line are adapted such that, during filling with fuel by means of the nozzle inserted in the filler pipe, the fuel vapors are preferably evacuated through the vent line,
　　at least one gauge which measures the volume of fuel in the tank,
the detection method being remarkable in that it involves continuously measuring the volume of fuel in the tank during filling and comparing a volume profile thus measured with respect to time against a predetermined volume profile, wherein a defective flow in the vent line is detected if the measured volume profile does not match the predetermined volume profile.

More precisely, the detection method comprises, during filling, the following steps:
　　Step E0: continuously measuring the fuel volume during filling, and if the volume is below a threshold, then
　　Step E1: initializing a stoppage number of the nozzle, otherwise stoppage of the method (Step E6b),
　　Step E2: calculating a volume gradient over a predetermined duration,
　　Step E3: if the gradient is lower than a predetermined gradient, then
　　Step E4: incrementing the stoppage number of the nozzle, Otherwise repetition of steps E0 to E4,
　　Step E5: if the stoppage number of the nozzle exceeds a predetermined threshold value, then
　　Step E6a: detection of a defective flow, otherwise Repetition of steps E3 to E5.

Preferably, the predetermined gradient is a function of the measured fuel volume.

In a particular embodiment, the tank comprises two vessels, each equipped with a gauge, a first and a second gauge, wherein the detection method also comprises, in steps E0 and E2 respectively, calculation of the correlation between a volume measured by the first gauge and a volume measured by the second gauge, and calculation of a correlation between a volume gradient measured by the first gauge and a volume gradient measured by the second gauge, wherein detection of the defective flow is validated only if the correlation values are each greater than the respective threshold.

An aspect of the invention also concerns a motor vehicle comprising a device for purging a fuel vapor absorption filter of an internal combustion engine of said vehicle during a filling of a tank provided in said vehicle with fuel from a filler nozzle comprising a venturi effect duct, so as to stop the filling when the duct is full of fuel, said vent line connecting the fuel tank to said filter, the tank being equipped with:
　　a filler pipe, at the end of which is a stopper, and
　　a degassing pipe connecting the top of the tank to the filler pipe, wherein the stopper, the degassing pipe and the vent line are adapted such that, during filling with fuel by means of the nozzle inserted in the filler pipe, the fuel vapors are preferably evacuated through the vent line,
　　a gauge which measures the volume of fuel in the tank, said device being characterized in that it comprises:
　　　　means for continuously measuring the fuel volume during filling,
　　　　means for calculating a volume gradient over a predetermined duration,
　　　　means for comparison between said calculated gradient and a predetermined gradient,
　　　　means for initializing and incrementing a stoppage number of the nozzle as a function of the comparison thus performed,
　　　　means for comparison between the stoppage number of the nozzle and a predetermined threshold value in order to detect a defective flow.

Suitably, the means for continuously measuring the fuel volume, the means for initializing and incrementing a stoppage number of the nozzle, the means for calculating a volume gradient over predetermined duration, the means for comparison between said calculated gradient and a predetermined gradient, and the means for comparison between the stoppage number of the nozzle and the predetermined threshold value, take the form of software contained in a control module.

DETAILED DESCRIPTION OF THE PREFERRED EMBODIMENTS

Figure 1:
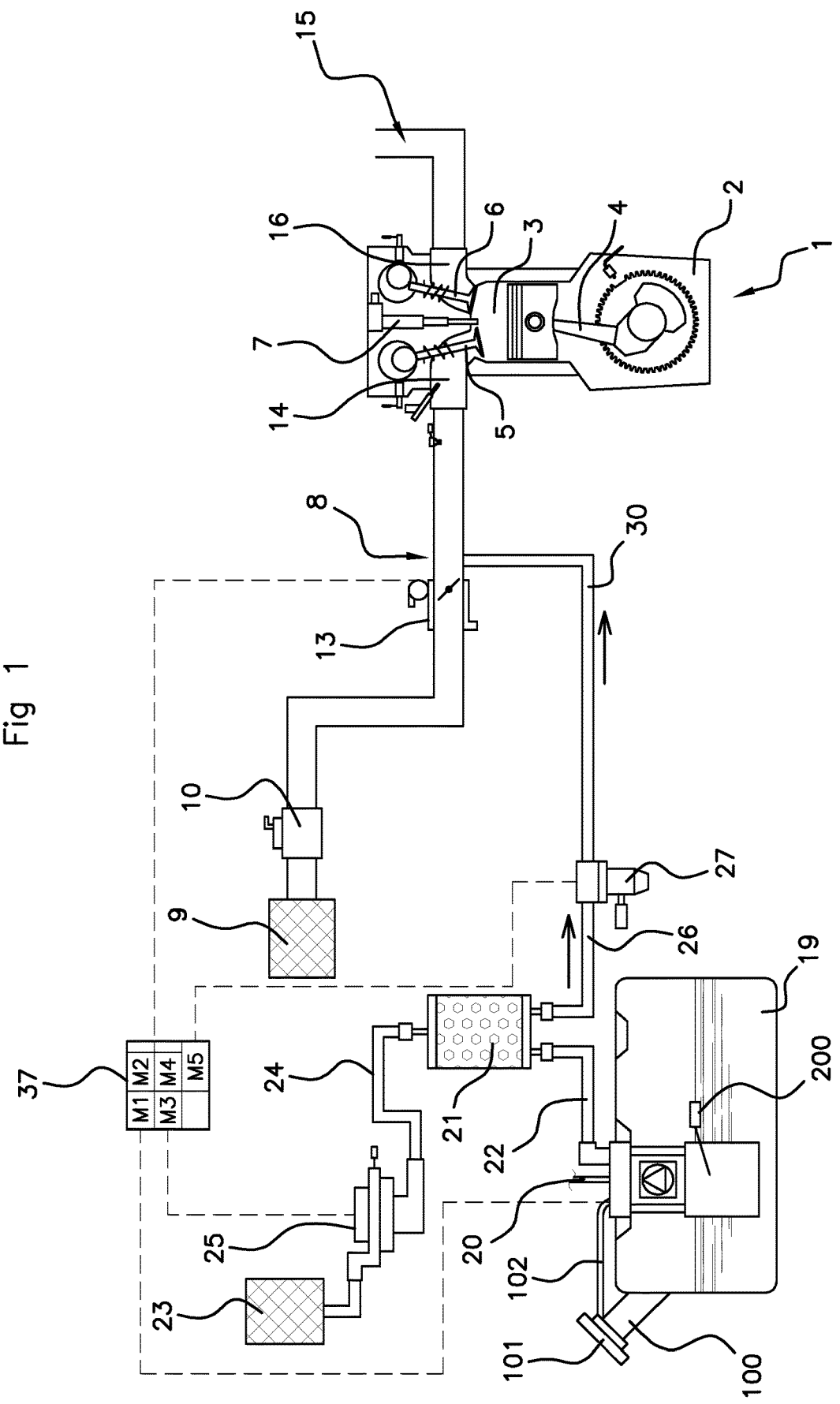
FIG. 1 is a diagrammatic view of an internal combustion engine equipped with a system for recycling fuel vapors originating from the fuel tank for the engine, allowing implementation of the method according to an aspect of the invention for detecting a defective flow of fluid in the vent line connecting the tank to the filter.

The detection method according to an aspect of the invention is described below when applied to the detection of defective flow of fluid, here petrol vapors in a purge line of a purge device of a fuel vapor absorption filter of an internal combustion engine 1, shown in FIG. 1 in the form of a single cylinder 2:
　　containing a piston 3 actuating a conrod 4,
　　comprising an intake valve 5, an exhaust valve 6 and an injector 7.

The engine 1 also comprises a tubing system 8 for intake of air into each cylinder 2, comprising principally and successively, in the direction of air flow:
an air filter 9,
an air mass meter 10,
a butterfly valve 13,
an intake manifold 14.

The engine 1 also comprises an exhaust tubing system 15 in which an exhaust manifold 16 is arranged.

The engine is also equipped with a system for recycling fuel vapors originating from the fuel tank 19, supplying the injectors 7 via a fuel supply line 20.

The recycling system comprises a fuel vapor absorption filter 21 connected to the tank 19 by a pipe 22, called a vent line, and containing active charcoal granules suitable for trapping the fuel vapors originating from the tank 19.

The recycling system also comprises a breather line comprising an air filter 23 connected to the absorption filter 21 by a breather pipe 24 which contains a breather valve 25 of the type known as NVLD3 or NVLD5, meaning "natural vacuum leak detection". Said breather valve 25 opens when the pressure in the tank 19 exceeds a predetermined value, which situation mainly occurs on refueling, thus avoiding over-pressurizing the tank. Said breather valve 25 allows the circuit to be opened to air and allows air to be drawn in when the vacuum in the tank 19 exceeds a predetermined vacuum threshold value.

The tank 19 comprises a filler pipe 100, part of which is outside the tank 19 and comprises a stopper 101, part of which is removable to allow insertion of a fuel filler nozzle 300 during refueling.

Said stopper 101 is sealed when closed and has a very low leakage flow, i.e. a very low escape of fuel vapor towards the outside of the tank 19 when the nozzle is inserted, in order to comply with American antipollution standards.

The filler pipe 100 extends towards the base of the tank 19, and therefore has a portion which is constantly immersed in fuel.

The tank 19 also comprises a degassing pipe 102 connecting the top of the tank 19 to the filler pipe 100. Said pipe allows balancing of pressures during refueling, i.e. balancing the pressure prevailing in the tank 19 with the pressure prevailing in the filler pipe 100. The degassing pipe 102 thus redirects part of the fuel vapors under positive pressure into the filler pipe 100.

However, since the diameter of the degassing pipe 102 is smaller than that of the vent line 22, and the stopper 101 is effectively sealed once the nozzle is inserted therein, the vapors are almost all evacuated towards the vent line 22 during filling of the tank 19 with fuel.

A stopper is a part comprising an upper removable portion which is removed by the user in order to fill the tank, and a lower fixed part which is effectively sealed when the nozzle 300 is inserted through said lower part during filling of the tank with fuel, and opens onto the filler pipe 100.

The reservoir 19 is also equipped with a gauge 200 which continuously measures the volume of fuel during filling.

The nozzle 300 itself is adapted to stop filling with fuel in the tank 19 if the fuel volume in the tank 19 is above a threshold value or if the end of the nozzle 300 is immersed in fuel.

To this end, the nozzle 300 is for example fitted with a venturi effect duct allowing the air to circulate and compensate for the vacuum created by the fuel filling. If the duct is filled with fuel when the tank is full, the nozzle 300 blocks the distribution of fuel in order to avoid the tank overflowing.

The recycling system also comprises a purge line 26 connecting the absorption filter 21 to a controllable purge valve 27, downstream of which said purge line, intended to conduct fuel vapors, comprises a purge pipe 30 extending from the purge valve 27 and the intake tubing system 8 upstream of the butterfly valve 13.

The recycling system also comprises a control module 37 generally comprising an electronic engine control unit (ECU) and able in particular to control:
the breather valve 25,
the purge valve 27, in particular to command its opening with the aim of performing a cycle of extracting and purging the fuel vapors trapped in the absorption filter 21,
and to receive data from the gauge 200.

The detection method according to an aspect of the invention involves detecting a defective flow of fuel vapors in the vent line 22, i.e. in the pipe connecting the fuel tank 19 to the purge valve 21, during filling of the tank with fuel. The defective flow, i.e. the flow of hydrocarbon vapors, may be caused for example by a crushing of the pipe for example.

The detection method according to an aspect of the invention will now be described.

An aspect of the invention proposes to compare, during the filling phase, the profile of fuel volume in the tank measured by the gauge 200 over time, with a predetermined fuel volume profile.

The term "filling profile" means the continuous measurement of the fuel volume in the tank 19 relative to time during the filling phase.

The volume is measured by the gauge 200 which is connected to the control module 37, which processes the raw measurement and converts this into volume as a function of the geometry of the tank 19.

According to an aspect of the invention, the detection of a defective gas flow in the vent line 22 is validated if the two volume profiles do not match.

In fact, the applicant has found that in the case of a defective gas flow in the vent line 22 during filling of the tank 19 with fuel, petrol vapors can no longer be evacuated towards the purge filter 21.

The vapor pressure then increases in the tank 19, and some of the vapors escape from the tank via the degassing pipe 102 which is connected to the stopper 101, and through the stopper itself.

However, the degassing pipe 102 and the stopper 101 are not designed to evacuate high vapor flows, so the pressure continues to increase in the tank 19, which means that the fuel level in the filler pipe 100 rises.

Figure 2:
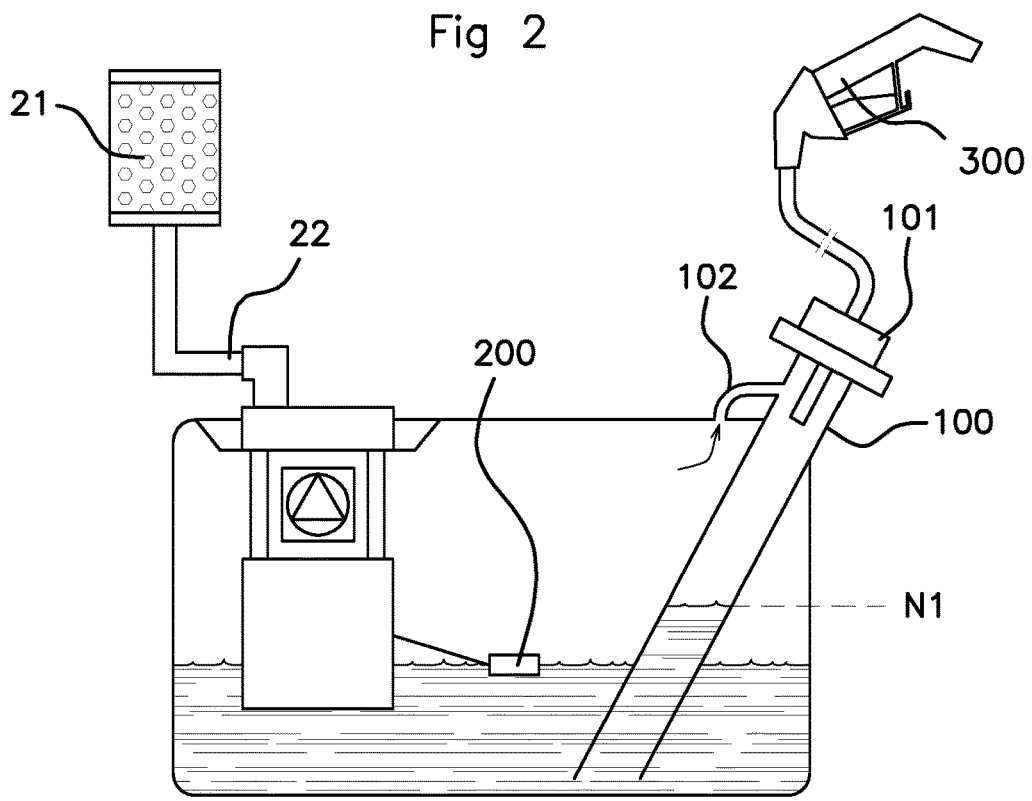
FIG. 2 is a diagrammatic view depicting the fuel tank during filling by means of a nozzle, in the absence of a defective gas flow in the vent line.
Figure 3:
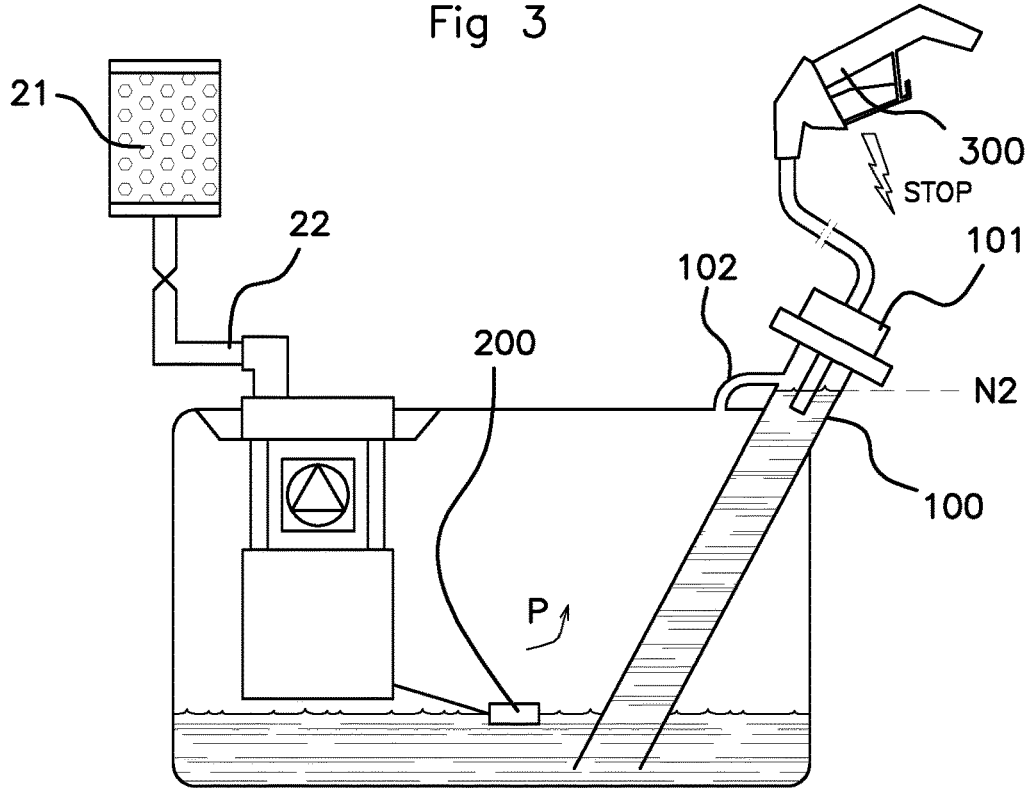
FIG. 3 is a diagrammatic view depicting the fuel tank during filling by means of a nozzle, in the presence of a defective gas flow in the vent line, FIG. 4 graphically illustrates the change in fuel volume during filling in the presence of a defective gas flow in the vent line, illustrating the progress of the detection method according to an aspect of the invention.

This is illustrated in FIGS. 2 and 3.

FIG. 2 shows the level N1 of fuel in the filler pipe 100 during refueling, in the case where there is no defective gas flow in the vent line 22.

FIG. 3 shows the level N2 of fuel in the filler pipe 100 during refueling, in the case where there is a defective gas flow in the vent line 22. For example, the vent line 22 is crushed.

In this case, the fuel level N2 is such that the end of the nozzle 300 is immersed in the fuel, the safety mechanism of the nozzle 300 is triggered, and the fuel distribution is stopped momentarily. The fuel distribution only resumes if the fuel level in the filler pipe 100 falls and the end of the nozzle 300 is no longer immersed in the fuel.

Once the fuel distribution has stopped, the pressure prevailing in the tank 19 falls and vapors continue to escape at a low rate through the degassing pipe 102 and through the stopper 101.

Once the pressure has fallen below a threshold value, the liquid level in the filler pipe 100 falls, and once the end of the nozzle 300 is no longer immersed in the fuel, fuel distribution may resume. Fuel distribution is resumed for example by simple pressure of the user's hand on the trigger of the nozzle 300.

This is repeated until the tank 19 is filled, i.e. until a threshold volume Vs is reached. This threshold volume Vs may be the maximum volume of the tank or any volume of fuel which the user wishes to introduce into the tank.

Thus if there is a defective gas flow in the vent line 22, the fuel filling profile in the tank 19 shows flat stages which correspond to the distribution stoppage periods of the nozzle 300.

Figure 4:
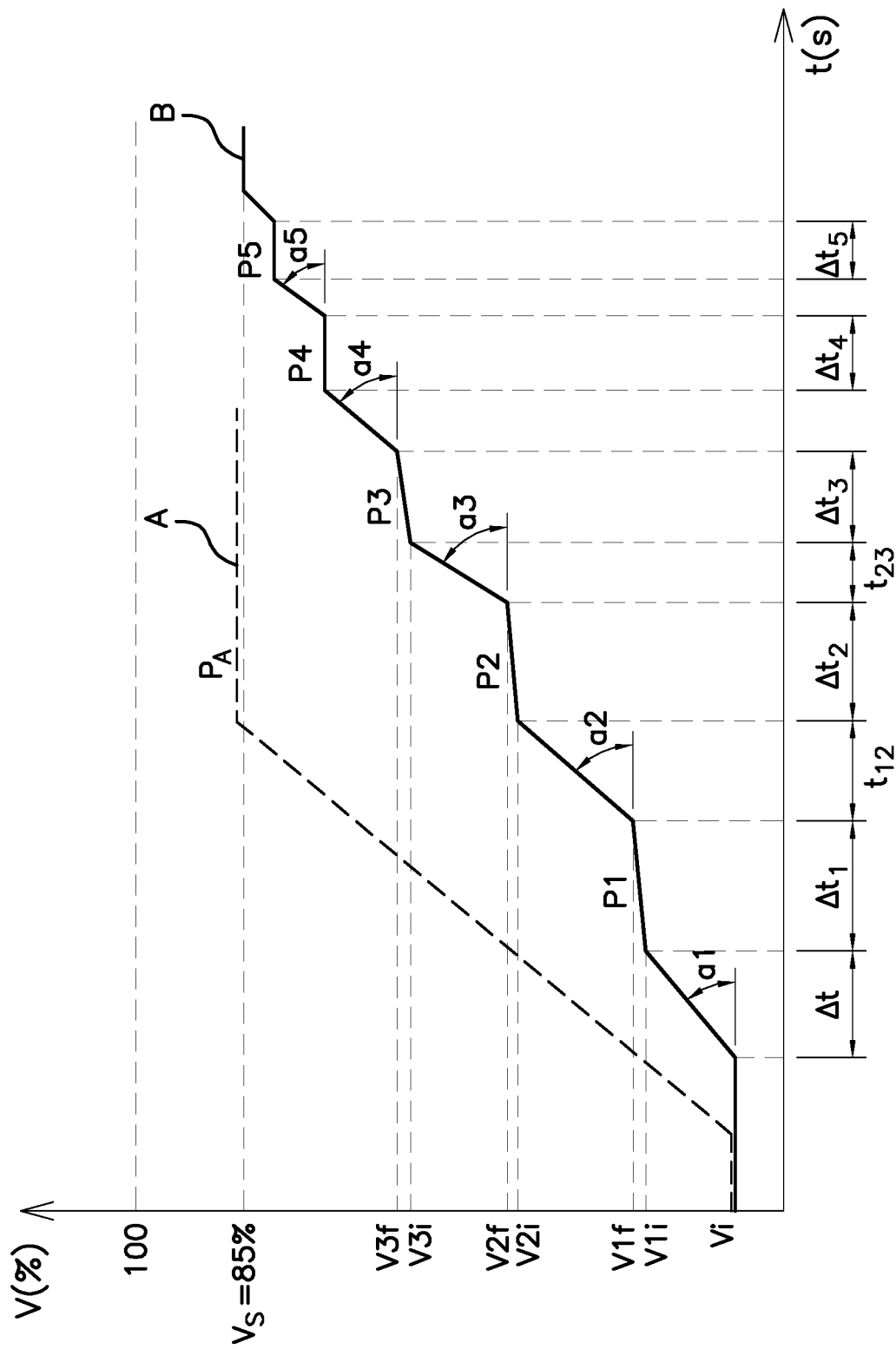
Figure 5:
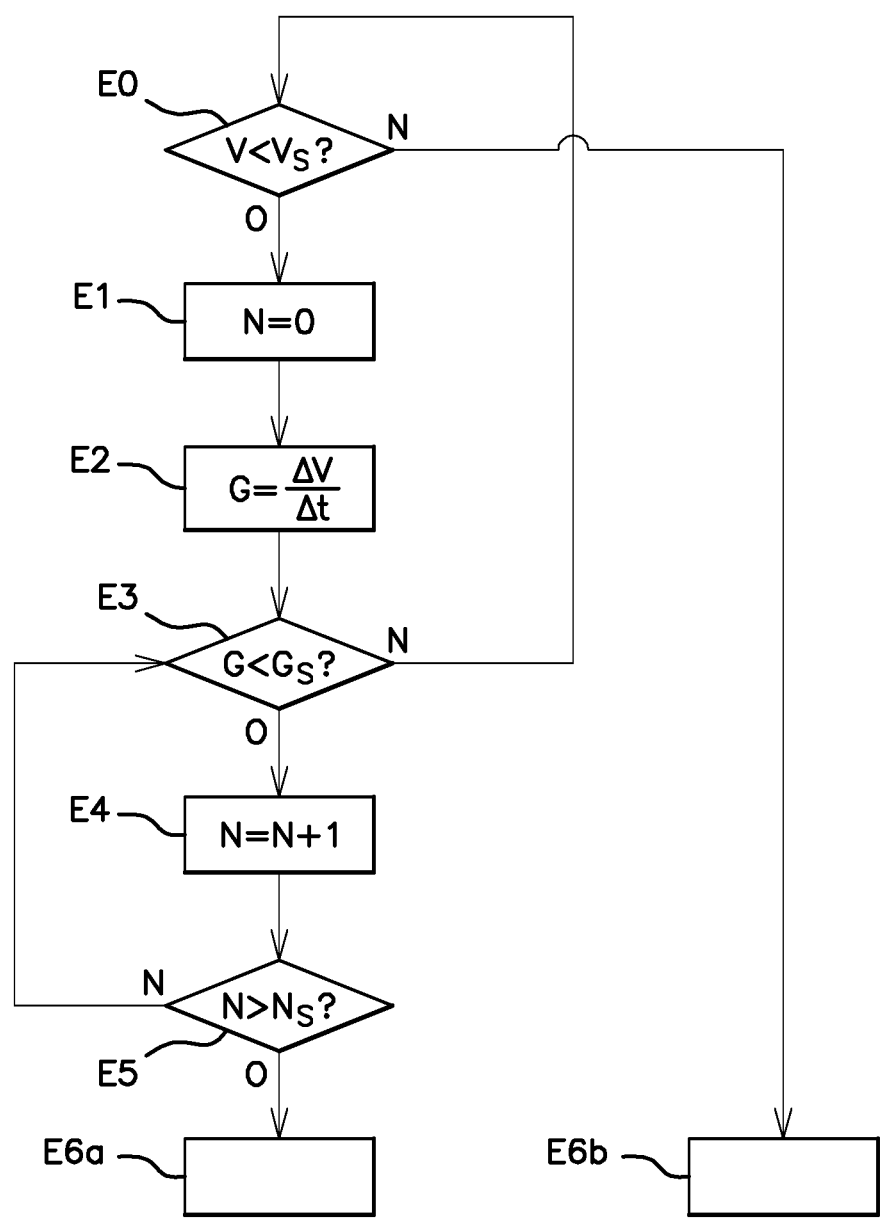
FIG. 5 is a flow chart showing the steps of the detection method according to an aspect of the invention.

This is illustrated in FIG. 4 which shows:
curve A: the profile of fuel volume in the tank 19 during a filling phase, i.e. the fuel volume V measured by the gauge 200 as a function of time t with no defective gas flow in the vent line,
curve B: the profile of fuel volume in the tank 19 during a filling phase, i.e. the fuel volume V measured by the gauge 200 as a function of time t with a defective gas flow in the vent line.

With no defective gas flow in the vent line 22, on curve A during fuel filling, the fuel volume increases continuously and uninterruptedly in virtually linear fashion (in this example) until it reaches the threshold volume Vs, representing for example 85% of the total volume of the tank 19.

Naturally, the fuel volume profile depends on the geometry of the tank 19 and may take the form of a polynomial curve.

A stoppage of the nozzle 300 then occurs, indicating to the user that the tank is full, which corresponds to flat stage $P_A$ during which the fuel distribution is stopped and the fuel volume no longer increases.

When there is a defective flow in the vent line 22, the fuel volume profile during the filling phase illustrated in curve B has several flat stages P1, P2, P3, . . . P5, each corresponding to a stoppage of fuel distribution of the nozzle 300 for a duration Δt1, Δt2, Δt3 . . . Δt5 necessary for the pressure in the tank to diminish, and so that fuel filling can resume.

Thus the applicant has found that in the presence of a defective gas flow in the vent line 22, the fuel volume profile during the filling phase is distinguished from a predetermined volume profile (i.e. without defective flow) by the presence of a plurality of flat stages.

A flat stage is any interruption in gradient in the profile of curve B with a gradient lower than a predetermined threshold or virtually zero.

According to an aspect of the invention, the detection method comprises the following steps which take place during filling of the tank 10 with fuel:
Step E0: continuously measuring the fuel volume V during filling, and if the volume V is below a threshold Vs which corresponds to the maximum fill volume, then
Step E1: initialising a stoppage number (N) of the nozzle 300, or N=0,
otherwise the tank 19 is filled and the process stops (E6b),
Step E2: calculating a gradient of volume V over a predetermined duration Δt, or:

$$G = \frac{\Delta V}{\Delta t}$$

Step E3: if the gradient G is less than a predetermined gradient Gs, i.e. if the filling profile has a flat stage, then
Step E4: incrementing the stoppage number of the nozzle 300, or N=1, otherwise steps E0 to E4 are repeated,
Step E5: if the stoppage number N of the nozzle exceeds a predetermined threshold value, or if N>Ns, then
Step 6a: detection of a defective flow, otherwise the steps E3 to E5 are repeated.

In FIG. 4, curve B has a first flat stage P1 of gradient equal to:

$$G1 = \frac{(V1f - V1i)}{\Delta t1}$$

The first gradient G1 is lower than a threshold gradient Gs, corresponding for example to the first slope a1 of the curve during which fuel filling has been possible without stoppage:

$$Gs = a1 = \frac{(V1i - Vi)}{\Delta t}$$

Thus a first flat stage is detected and the stoppage number of the nozzle 300 is incremented, or N=1.

Curve B has a second flat stage P2 of gradient:

$$G2 = \frac{(V2f - V2i)}{\Delta t1}$$

Similarly, the second gradient G2 is lower than Gs, with Gs equal to:

$$Gs = a1 = \frac{(V1i - Vi)}{\Delta t}$$

Thus a second flat stage is detected and the stoppage number of the nozzle is incremented, or N=2.

This method is repeated each time a calculated gradient is lower than the threshold gradient Gs, the threshold gradient being representative of fuel filling without defective flow in the vent line 22.

Then when the stoppage number N of the nozzle is greater than a predetermined threshold, for example if N>Ns, with Ns=5, then detection of a defective flow in the vent line 22 is validated. In fact, it is possible for the user to stop fuel filling of his own accord at least once (N=1), wherein this does not signify a defective flow in the vent line 22.

However, if the stoppage number N of the nozzle is greater than a threshold, Ns for example is 5, the stoppages are due to a defective flow in the vent line 22 and not caused by voluntary filling stoppages by the user.

In a preferred embodiment, the threshold gradient is not a fixed value but depends on the geometry of the tank and hence on the fuel volume in the tank 19.

Thus the first threshold gradient Gs1 is equal to the first slope of curve a1, or:

$$Gs1 = a1 = \frac{(V1i - Vi)}{\Delta t}$$

Then the second threshold gradient Gs2 is equal to the second slope of the curve a2 corresponding to the final filling phase with no stoppage, or:

$$Gs2 = a2 = \frac{(V2i - V1f)}{t12}$$

Similarly, the third threshold gradient Gs3 is equal to the third slope of curve a3, or:

$$Gs3 = a3 = \frac{(V3i - V2f)}{t23}$$

Each calculated gradient is this compared to the last calculated threshold gradient of part of the curve with no filling stoppage.

Naturally, the comparison may include a tolerance in order to avoid false detections of stoppage of the nozzle 300. For example, the gradient is compared to plus or minus 10% of a threshold gradient.

Thus the first gradient P1 is compared to the first threshold gradient Gs1, the second gradient P2 is compared to the second threshold gradient Gs2, etc.

The gradient may be calculated continuously or with a fixed frequency.

The time interval selected for calculating the gradient is for example fixed and lies between 100 ms and 1 second:

$$\Delta t1 = \Delta t2 = \Delta t3 = [100 \text{ ms}, 1 \text{ s}].$$

Similarly, the time interval selected for calculating the threshold gradient may be fixed and lies between 100 ms and 1 second:

$$\Delta t = t12 = t23 = [100 \text{ ms}, 1 \text{ s}].$$

In the example illustrated in FIG. 4, the gradients are calculated over the entire duration of the flat stages; however, the gradients may be calculated over part of the respective flat stage, for example with a fixed frequency, several times per flat stage. However, in order for a nozzle stoppage to be counted (N=N+1), it is necessary for two successive flat stages to be separated by a filling phase with no stoppage, i.e. no flat stage. More precisely, each new nozzle stoppage is detected when it is preceded by a filling phase with no stoppage.

The threshold gradients may for example be determined using a filling curve of the tank 19 which was previously determined during a calibration phase with no defective flow and during a filling with no defective flow. The threshold gradients may also be determined, as explained above, by comparing the gradients to the first calculated gradient a1, said first gradient a1 being representative of fuel filling without stoppage (i.e. without flat stage), since the pressure in the tank at the start of filling is not sufficiently high to trigger stoppage of the nozzle.

In a particular embodiment, for a tank with two interconnected vessels in order to pass above an arch below the chassis of the vehicle, each vessel having its own fuel gauge, the method of an aspect of the invention proposes performing correlation tests between the volume measurements made by the two gauges (step E0), and on the gradient calculations performed from the volumes measured by the two gauges (step E2). The defective gas flow in the vent line 22 is only validated if the correlation values are each greater than a respective threshold.

The detection method is performed on a vehicle using (see FIG. 1):
means M1 for continuously measuring the fuel volume,
means M3 for calculating a volume gradient over a predetermined duration,
means M4 for comparison between said calculated gradient and a predetermined gradient,
means M2 for initializing and incrementing a stoppage number of the nozzle as a function of the comparison thus performed,
means M5 for comparison between the stoppage number of the nozzle and a predetermined threshold value in order to detect a defective flow.

Preferably, the means M1 for continuously measuring the fuel volume, the means M2 for initializing and incrementing a stoppage number of the nozzle, the means M3 for calculating a volume gradient over predetermined duration, the means M4 for comparison between said calculated gradient and a predetermined gradient, and the means M5 for comparison between the stoppage number of the nozzle and the predetermined stoppage number, take the form of software contained in a microprocessor, for example in the control module 37 (see FIG. 1).

An aspect of the invention thus allows, in a suitable, low-cost manner which is simple to implement, robust detection of the presence of a defective gas flow in the vent line of a purge device on board the motor vehicle, requiring no additional sensors.

The invention claimed is:

1. A method for detecting a defective gas flow in a vent line of a device for purging a fuel vapor absorption filter of an internal combustion engine of a vehicle during a filling of a tank provided in the vehicle with fuel from a filler nozzle, the filler nozzle comprising a venturi effect duct, so as to stop the filling when the duct is full of fuel,
wherein the detection method comprises:
continuously measuring the volume of fuel in the tank during the filling, the tank being equipped with:
a filler pipe, at the end of which is a stopper,
a degassing pipe connecting the top of the tank to the filler pipe, wherein the stopper, the degassing pipe and the vent line are adapted such that, during filling with fuel by means of the nozzle inserted in the filler pipe, the fuel vapors are preferably evacuated through the vent line, and
at least one gauge which measures a volume of fuel in the tank;
comparing a volume profile thus measured with respect to time against a predetermined volume profile; and
detecting a defective flow in the vent line of the device for purging the fuel vapor absorption filter of the internal combustion engine of the vehicle if the measured volume profile does not match the predetermined volume profile, the vent line connecting the tank to the filter.

2. The detection method as claimed in claim 1, wherein the tank comprises a first vessel equipped with a first gauge and a second vessel equipped with a second gauge, wherein the detection method also comprises, in steps E0 and E2 respectively, calculating the correlation between a volume measured by the first gauge and a volume measured by the second gauge, and calculating a correlation between a volume gradient measured by the first gauge and a volume gradient measured by the second gauge, wherein detection of the defective flow is validated only if the correlation values are each greater than a respective threshold.

3. The detection method as claimed in claim 1, wherein during the filling with fuel, further comprising:

Step E0: continuously measuring the fuel volume, and if the volume is below a threshold, then Step E1: initializing a stoppage number of the nozzle, otherwise stoppage of the method, Step E2: calculating a gradient of volume over a predetermined duration, Step E3: if the gradient is lower than a predetermined gradient, then Step E4: incrementing the stoppage number of the nozzle, Otherwise repetition of steps E0 to E4, Step E5: if the stoppage number of the nozzle exceeds a predetermined threshold value, then Step E6a: detection of a defective flow, otherwise Repetition of steps E3 to E5.

4. The detection method as claimed in claim 3, wherein the predetermined gradient is a function of the measured fuel volume.

5. The detection method as claimed in claim 3, wherein the tank comprises a first vessel equipped with a first gauge and a second vessel equipped with a second gauge, wherein the detection method also comprises, in steps E0 and E2 respectively, calculating the correlation between a volume measured by the first gauge and a volume measured by the second gauge, and calculating a correlation between a volume gradient measured by the first gauge and a volume gradient measured by the second gauge, wherein detection of the defective flow is validated only if the correlation values are each greater than a respective threshold.

6. The detection method as claimed in claim 4, wherein the tank comprises a first vessel equipped with a first gauge and a second vessel equipped with a second gauge, wherein the detection method also comprises, in steps E0 and E2 respectively, calculating the correlation between a volume measured by the first gauge and a volume measured by the second gauge, and calculating a correlation between a volume gradient measured by the first gauge and a volume gradient measured by the second gauge, wherein detection of the defective flow is validated only if the correlation values are each greater than a respective threshold.

7. A motor vehicle comprising:
- a device for purging a fuel vapor absorption filter of an internal combustion engine of said vehicle during a filling of a tank provided in said vehicle with fuel from a filler nozzle, the filler nozzle comprising a venturi effect duct, so as to stop the filling when the duct is full of fuel, and further comprising a vent line connecting the fuel tank to said filter; and
- the tank, the tank being equipped with:
  - a filler pipe, at the end of which is a stopper,
  - a degassing pipe connecting the top of the tank to the filler pipe, wherein the stopper, the degassing pipe and the vent line are adapted such that, during filling with fuel by means of the nozzle inserted in the filler pipe, the fuel vapors are preferably evacuated through the vent line, and
  - a gauge which measures the volume of fuel in the tank, wherein said device comprises a control module which is programmed to:
- continuously measure the volume of fuel during filling,
- calculate a volume gradient over a predetermined duration,
- compare between said calculated gradient and a predetermined gradient,
- initialize and increment a stoppage number of the nozzle as a function of the comparison thus performed, and
- compare between the stoppage number of the nozzle and a predetermined threshold value in order to detect a defective flow.

* * * * *